(12) United States Patent
Faletti

(10) Patent No.: US 6,655,141 B1
(45) Date of Patent: Dec. 2, 2003

(54) AIRFLOW SYSTEM FOR ENGINE WITH SERIES TURBOCHARGERS

(75) Inventor: James Joseph Faletti, Spring Valley, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/144,029

(22) Filed: May 14, 2002

(51) Int. Cl.[7] ............................. F02B 33/44; F02B 37/00
(52) U.S. Cl. ........................................... 60/602; 60/612
(58) Field of Search .................. 60/612, 602

(56) References Cited

U.S. PATENT DOCUMENTS

| | | | |
|---|---|---|---|
| 5,447,031 A | 9/1995 | Betts et al. ................... | 60/603 |
| 5,899,070 A | 5/1999 | Droessler et al. ............. | 60/612 |
| 5,974,801 A | 11/1999 | Houtz ......................... | 60/602 |
| 6,012,289 A | 1/2000 | Deckard et al. ............... | 60/602 |
| 6,055,811 A | 5/2000 | Maddock et al. .............. | 60/602 |
| 6,178,748 B1 | 1/2001 | Oleksiewicz .................. | 60/602 |
| 6,256,992 B1 | 7/2001 | Lewis, Jr. et al. ............. | 60/603 |
| 6,311,493 B1 * | 11/2001 | Kurihara et al. .............. | 60/612 |
| 6,378,308 B1 * | 4/2002 | Pfluger ........................ | 60/612 |

FOREIGN PATENT DOCUMENTS

| | | | |
|---|---|---|---|
| JP | 60169630 A | 9/1985 | |
| JP | 61178519 A | 8/1986 | |
| JP | 62101834 A | 5/1987 | |
| JP | 01142214 A | 6/1989 | |
| JP | 04017725 A | 1/1992 | |

OTHER PUBLICATIONS

Co–pending Application No. 10/143,799, filed May 14, 2002, entitled *Airflow System for Engine With Series Turbochargers*, Applicant—David A. Pierpont.

\* cited by examiner

*Primary Examiner*—Sheldon J. Richter
(74) *Attorney, Agent, or Firm*—Finnegan, Henderson, Farabow, Garrett & Dunner

(57) ABSTRACT

An airflow system for an engine includes first and second turbines coupled with first and second compressors, respectively. The first turbine receives exhaust from an exhaust manifold, and the first compressor supplies compressed air to an intake manifold. A wastegate valve, fluidly coupled with the exhaust manifold, is movable between a first position allowing exhaust to bypass at least one of the turbines and a second position restricting exhaust from bypassing. A controller restricts the supply of pressurized air to the wastegate valve such that the wastegate is in the second position when at least one of (i) a load of the engine is less than or equal to a predetermined load, (ii) a speed of the engine is less than or equal to a predetermined speed, and (iii) a temperature of air leaving the first compressor is less than or equal to a predetermined temperature.

20 Claims, 2 Drawing Sheets

AIRFLOW SYSTEM FOR ENGINE WITH SERIES TURBOCHARGERS

TECHNICAL FIELD

The present invention relates to a combustion engine and, more particularly, to an airflow control system for an internal combustion engine having series turbochargers.

BACKGROUND

An internal combustion engine may include one or more turbochargers for compressing a fluid, which is supplied to one or more combustion chambers within corresponding combustion cylinders. Each turbocharger typically includes a turbine driven by exhaust gases of the engine and a compressor driven by the turbine. The compressor receives the fluid to be compressed and supplies the compressed fluid to the combustion chambers. The fluid compressed by the compressor may be in the form of combustion air or an air/fuel mixture.

An internal combustion engine having series turbochargers may include a wastegate valve for achieving target boost at different altitudes by bleeding exhaust gases. As disclosed in U.S. Pat. No. 5,974,801 (issued to Houtz on Nov. 2, 1999), the engine speed, boost pressure, rack position, and barometric pressure may be monitored. The wastegate valve may then be actuated based on one or more of the monitored parameters.

When boost pressure optimization is a primary objective, a wastegate valve must be made of materials capable of withstanding the high pressures and high temperatures associated with high boost. Such materials can greatly increase the cost of wastegate valve. Further, when boost pressure optimization is a primary objective, fuel consumption is typically a secondary concern.

The present invention is directed to overcoming one or more of the problems as set forth above.

SUMMARY OF THE INVENTION

According to one exemplary aspect of the invention, an airflow system for an internal combustion engine having an intake manifold and an exhaust manifold is provided. The airflow system may include a first turbocharger including a first turbine coupled with a first compressor. The first turbine may be configured to receive exhaust flow from the exhaust manifold, and the first compressor may be configured to supply compressed air to the intake manifold. A second turbocharger arranged in series with the first turbocharger may include a second turbine coupled with a second compressor. The system may include a wastegate valve fluidly coupled with the exhaust manifold and movable between a first position and a second position. The first position allows fluid flow exhausted by the engine to bypass at least one of the first turbine and the second turbine, and the second position restricts fluid flow exhausted by the engine from bypassing the first turbine and the second turbine. The system may include a controller configured to restrict supply of pressurized air to the wastegate valve such that the wastegate is in the second position at times when at least one of (i) a monitored load of the engine is less than or equal to a predetermined load for a monitored speed of the engine, (ii) a monitored speed of the engine is less than or equal to a predetermined speed for a monitored load of the engine, and (iii) a monitored temperature of compressed air leaving the first compressor is less than or equal to a predetermined temperature.

According to another exemplary aspect of the invention, an internal combustion engine includes an intake manifold, an exhaust manifold, and first and second turbochargers arranged in series. The first turbocharger may include a first turbine coupled with a first compressor, wherein the first turbine is configured to receive exhaust flow from the exhaust manifold, and the first compressor is configured to supply compressed air to the intake manifold. The second turbocharger may include a second turbine coupled with a second compressor. A wastegate valve may be fluidly coupled with the exhaust manifold and movable between a first position and a second position. The first position allows fluid flow exhausted by the engine to bypass at least one of the first turbine and the second turbine, and the second position restricts fluid flow exhausted by the engine from bypassing the first turbine and the second turbine. A control valve may be operable to control supply of pressurized air to the wastegate valve. A controller may be electrically coupled to the control valve and configured to operate the control valve to restrict the supply of pressurized air to the wastegate valve such that the wastegate is in the second position at times when at least one of (i) a monitored load of the engine is less than or equal to a predetermined load for a monitored speed of the engine, (ii) a monitored speed of the engine is less than or equal to a predetermined speed for a monitored load of the engine, and (iii) a monitored temperature of compressed air leaving the first compressor is less than or equal to a predetermined temperature.

According to yet another exemplary aspect of the invention, a method of controlling airflow to an internal combustion engine having an air intake manifold and an exhaust manifold is provided. The method may include imparting rotational movement to a first turbine and a first compressor of a first turbocharger with exhaust air flowing from the exhaust manifold of the engine, and imparting rotational movement to a second turbine and a second compressor of a second turbocharger with exhaust air flowing from an exhaust duct of the first turbocharger. Air drawn from atmosphere may be compressed with the second compressor, and air received from the second compressor may be compressed with the first compressor. The method may include supplying compressed air from the first compressor to the air intake manifold, fluidly coupling a wastegate valve with the exhaust manifold, and monitoring at least one of engine load, engine speed, and temperature of the compressed air leaving the first compressor. The wastegate valve may be movable between a first position and a second position. The first position allows fluid flow exhausted by the engine to bypass at least one of the first turbine and the second turbine, and the second position restricts fluid flow exhausted by the engine from bypassing the first turbine and the second turbine. The method may also include selectively controlling the supply of compressed air to the wastegate valve such that the wastegate is in the second position at times when at least one of (i) the monitored load of the engine is less than or equal to a predetermined load for the monitored speed of the engine, (ii) the monitored speed of the engine is less than or equal to a predetermined speed for the monitored load of the engine, and (iii) the monitored temperature of the compressed air leaving the first compressor is less than or equal to a predetermined temperature.

According to still another aspect of the invention, a method of controlling airflow to an internal combustion engine is provided. The method may include compressing a stream of air in a first turbocharger, compressing a stream of air in a second turbocharger, and sensing an engine parameter indicative of performance. The method may also include comparing the sensed engine parameter with a predetermined engine parameter and controlling a supply of compressed air to a compressed air cavity of a wastegate on at least one of the first turbocharger and the second turbocharger in response to the comparison.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate exemplary embodiments of the invention and, together with the description, serve to explain the principles of the invention. In the drawings.

DETAILED DESCRIPTION

Reference will now be made in detail to embodiments of the invention, examples of which are illustrated in the accompanying drawing.

Figure 1:
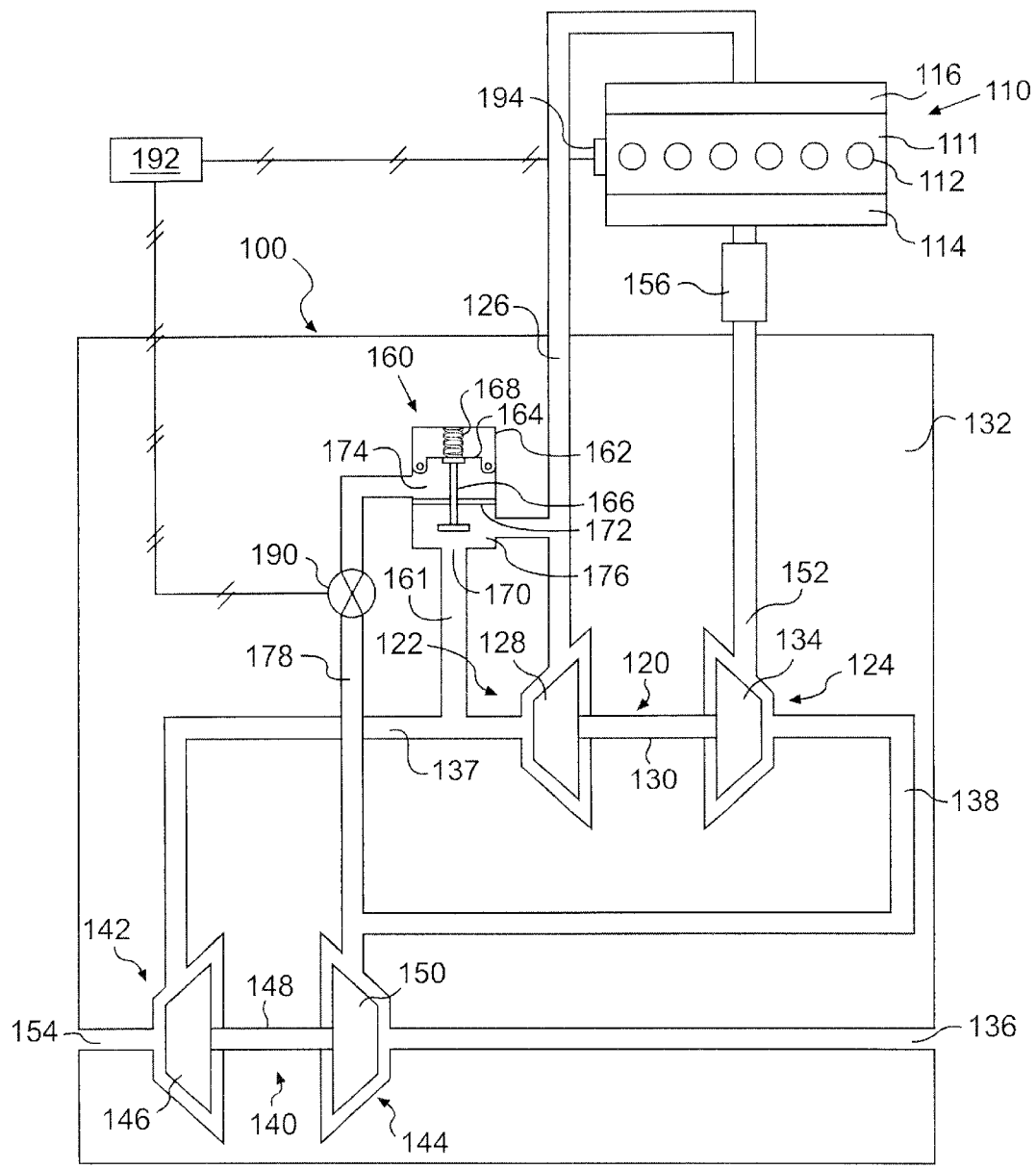
FIG. 1 is a combination diagrammatic and schematic illustration of an exemplary airflow system for an internal combustion engine in accordance with the invention.

Referring to FIG. 1, an exemplary airflow system 100 for an internal combustion engine 110 is shown. The engine 110 includes an engine block 111 defining a plurality of combustion cylinders 112, the number of which depends upon the particular application. For example, a 4-cylinder engine would include four combustion cylinders, a 6-cylinder engine would include six combustion cylinders, etc. Six combustion cylinders 112 are shown in FIG. 1.

The internal combustion engine 110 also includes an intake manifold 114 and an exhaust manifold 116. The intake manifold 114 provides fluid, for example, air or a fuel/air mixture, to the combustion cylinders 112. The exhaust manifold 116 receives exhaust fluid, for example, exhaust gas, from the combustion cylinders 112. The intake manifold 114 and the exhaust manifold 116 are shown as a single-part construction for simplicity in the drawing. However, it should be appreciated that the intake manifold 114 and/or the exhaust manifold 116 may be constructed as multi-part manifolds, depending upon the particular application.

The airflow system 100 may include a first turbocharger 120 and a second turbocharger 140. The first and second turbochargers 120, 140 may be arranged in series with one another. The first turbocharger 120 may include a first turbine 122 and a first compressor 124. The first turbine 122 may be fluidly connected to the exhaust manifold 116 via an exhaust duct 126. The first turbine 122 may include a turbine wheel 128 carried by a first shaft 130, which in turn may be rotatably carried by a housing 132, for example, a single-part or multi-part housing. The fluid flow path from the exhaust manifold 116 to the first turbine 122 may include a variable nozzle (not shown) or other variable geometry arrangement adapted to control the velocity of exhaust fluid impinging on the turbine wheel 128.

The first compressor 124 may include a compressor wheel 134 carried by the first shaft 130. Thus, rotation of the first shaft 130 by the turbine wheel 128 in turn may cause rotation of the compressor wheel 134. An intake duct 152 may provide fluid communication between the first turbocharger 120 and the intake manifold 114, such that the first compressor 124 may supply compressed air to the intake manifold 114 of the engine 110.

The second turbocharger 140 may include a second turbine 142 and a second compressor 144. A first conduit 137 may provide fluid communication between the first turbocharger 120 and the second turbocharger 140, such that exhaust from the first turbine 122 may be supplied to the second turbine 142. The second turbine 142 may include a turbine wheel 146 carried by a second shaft 148, which in turn may be rotatably carried by the housing 132. The second compressor 144 may include a compressor wheel 150 carried by the second shaft 148. Thus, rotation of the second shaft 148 by the turbine wheel 146 may in turn cause rotation of the compressor wheel 150.

The second turbocharger 140 may include an air inlet 136 providing fluid communication between the atmosphere and the second compressor 144. A second conduit 138 may provide fluid communication between the second turbocharger 140 and the first turbocharger 120, such that the second compressor 144 may supply compressed air to the first compressor 124. The second turbocharger 140 may include an exhaust outlet 154 for receiving exhaust fluid from the second turbine 142 and providing fluid communication with the atmosphere. In an embodiment, the turbochargers 120, 140 may be sized to provide substantially similar compression ratios. For instance, the first turbocharger 120 and the second turbocharger 140 may both provide compression ratios of between 1.5 to 1 and 3 to 1.

The airflow system 100 may include one or more air coolers 156 structured and arranged to extract heat from the air to lower the intake manifold temperature and to increase the air density. For example, the system 100 may include one or more air coolers 156, for example, aftercoolers, between the first compressor 124 and the intake manifold 114. Optionally, the airflow system 100 may include an additional air cooler (not shown), for example, an intercooler, between the second compressor 144 and the first compressor 124.

A wastegate valve 160 may be connected between the exhaust duct 126 and the first conduit 137. The wastegate valve 160 may be movable between a first position in which fluid flow exhausted by the engine 110 bypasses the first turbine 122 and a second position in which fluid flow exhausted by the engine 110 is restricted from bypassing the first turbine 122. The wastegate valve 160 may include a wastegate conduit 161 forming an exhaust path that is parallel to an exhaust path running to the first turbine 122. Alternatively, the wastegate conduit 161 may form an exhaust path providing fluid communication between the exhaust duct 126 and the exhaust outlet 154 so as to bypass both the first turbine 122 and the second turbine 142.

The wastegate valve 160 may include a housing 162 and a diaphragm 164 connected to the housing 162 near a perimeter of the diaphragm 164. The wastegate valve 160 may also include a valving member 166 and a spring 168 associated with the diaphragm 164. The spring 168 biases the valving member 166 to the closed position, in which the valving member 166 closes an exhaust bypass opening 170 to prevent exhaust gas from bypassing the turbine wheel 128 of the first turbine 122. A divider 172 may be attached within the housing 162 to create separate cavities. For example, the housing 162 may include a compressed air cavity 174 and an exhaust gas cavity 176. A third conduit 178 may fluidly couple the compressed air cavity 174 with the second compressor 144. Alternatively, the third conduit 178 may fluidly couple the compressed air cavity 174 with the first compressor 124 or an independent source of compressed air (not shown).

The airflow system 100 may include a control valve 190 associated with the third conduit 178. The control valve 190 may be operable to control the flow of compressed air from the second compressor 144 to the compressed air cavity 174 of the wastegate valve 160. For example, the control valve 190 may be an electronic pressure regulator. The system 100 may further include a controller 192 electrically coupled with the control valve 190 and configured to control the flow of compressed air through the control valve 190. The system 100 may include one or more sensors 194 associated with the engine 110 or components of the airflow system 100. The sensors 194 may be configured to sense one or more engine conditions such as, for example, engine speed, load, air temperature and/or pressure in the manifold, and air temperature and/or pressure at the first compressor 144. As one skilled in the art will recognize, the engine load can be implied from a sensed fuel command. The controller 192 may be electrically coupled with the sensors 194 and may control operation of the control valve 190 based on inputs received from the sensors 194.

The control valve 190 may be a two-position valve that either supplies pressurized fluid to the wastegate valve 160 or stops the supply. Alternatively, the control valve 190 may be a variable-position valve. For example, the controller 192 may control not only whether the control valve 190 is opened or closed, but also how far the valve 190 is opened.

Figure 2:
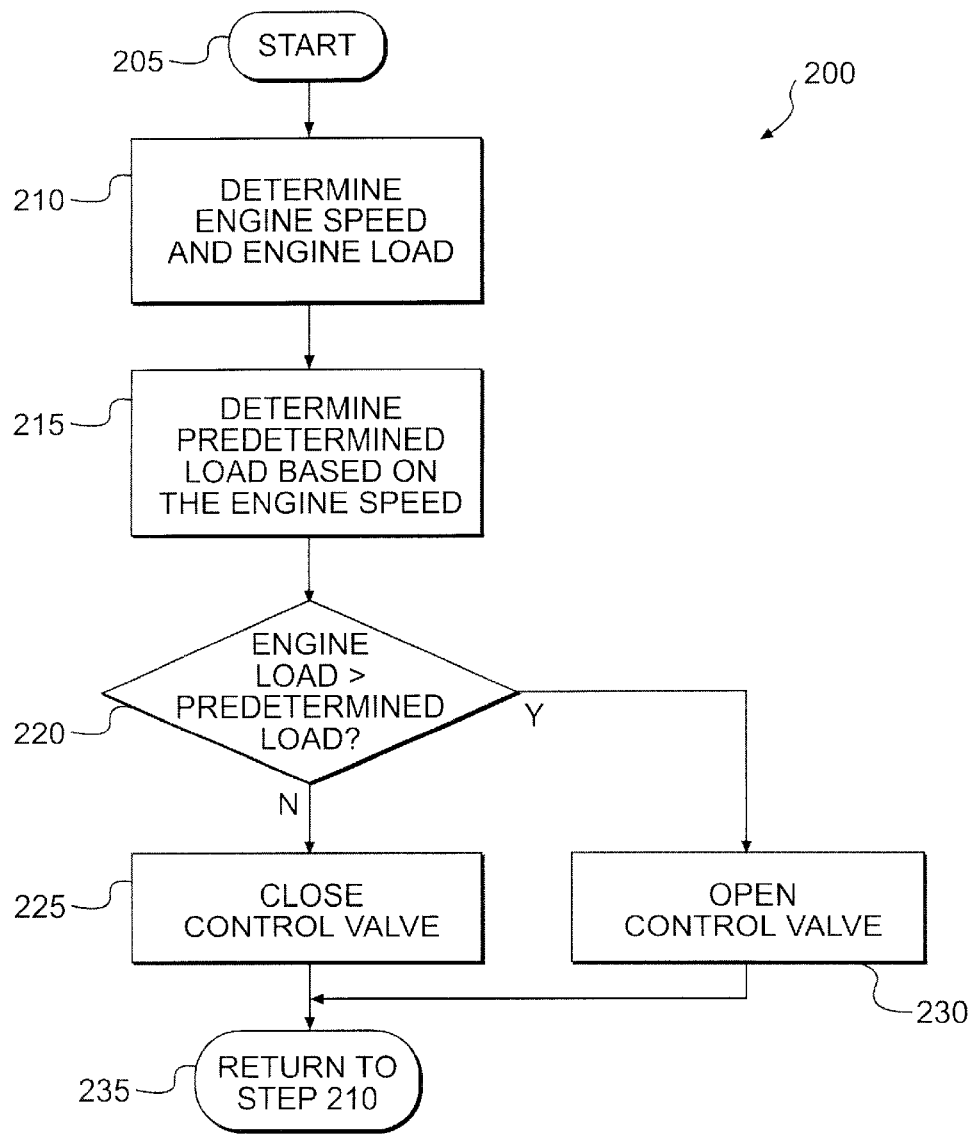
FIG. 2 is a flow chart illustrating an exemplary operation of an airflow system in accordance with the invention.

Referring to FIG. 2, an exemplary operation 200 of the airflow system is described. In step 205, control starts when the engine 110 is turned on and continues to step 210. In step 210 the controller 192 determines the engine speed and the engine load. The determinations may be made based on inputs from the sensors 194. Control then continues to step 215.

Then, in step 215, the controller 192 determines a predetermined engine load for the determined speed, and control continues to step 220. The predetermined engine load may be derived from an alogorithm, a look-up table, or the like programmed into the controller.

In step 220, the controller 192 determines whether the engine load exceeds the predetermined engine load. In step 220, if the engine load does not exceed the predetermined engine load, control continues to step 225. Otherwise, if the controller 192 determines that the engine load exceeds the predetermined engine load, control goes to step 230.

In step 225, the controller 192 operates the control valve 190 such that the supply of compressed air to the wastegate valve 160 does not open the wastegate valve 160. For instance, when the control valve 190 is a two-position valve, the controller 192 closes the valve 190. Control then continues to step 235, where control is returned step 210.

In step 230, when the engine load exceeds the predetermined engine load, the controller 190 operates the control valve 190 to supply compressed air to the wastegate valve 160 such that the wastegate valve 160 opens. The degree to which the wastegate valve 160 opens may depend on the bias of the spring 168. Control then continues to step 235, where control is returned step 210.

It should be appreciated that the exemplary operation 200 may additionally or alternatively be carried out by determining a predetermined engine speed based on the monitored engine load. Then, the control valve 190 may be opened when the monitored engine speed is greater than the predetermined engine speed. It should be further appreciated that in yet another exemplary embodiment, the exemplary operation 200 may additionally or alternatively monitor the temperature of compressed air leaving the first compressor 124. The monitored temperature may be compared with a predetermined temperature, and the control valve 190 may be opened when the monitored temperature exceeds the predetermined temperature.

INDUSTRIAL APPLICABILITY

During use, the internal combustion engine 110 operates in a known manner using, for example, the diesel principle of operation. Referring to the exemplary airflow system shown in FIG. 1, exhaust gas from the internal combustion engine 110 is transported from the exhaust manifold 116 through the exhaust duct 126 and impinges on and causes rotation of the turbine wheel 128. The turbine wheel 128 is coupled with the shaft 130, which in turn carries the compressor wheel 134. The rotational speed of the compressor wheel 134 thus corresponds to the rotational speed of the shaft 130.

Exhaust gas from the first turbocharger 120 is transported to the second turbocharger 140 via the exhaust duct 139. The exhaust gas from the first turbocharger 120 impinges on and causes rotation of the turbine wheel 146 of the second turbocharger 140. The turbine wheel 146 is coupled with the shaft 148, which in turn carries the compressor wheel 150. The rotational speed of the compressor wheel 150 thus corresponds to the rotational speed of the shaft 148. Exhaust gas from the second turbocharger 140 may be directed to the atmosphere via the exhaust outlet 154.

Rotation of the compressor wheel 150 of the second turbocharger 140 compresses air drawn from the atmosphere via the air inlet 136. The compressed air may then be supplied to the compressor wheel 134 of the first turbocharger 120 via the second conduit 138. The compressor wheel 134 may further compress the air and supply the compressed air to the intake manifold 114 of the engine 110 via the air outlet line 152. The compressed air may be cooled by one or more air coolers 156 before reaching the intake manifold 114. Since the first compressor 124 compresses air to a higher pressure than the second compressor 144, the first compressor 124 may be referred to as a high pressure compressor and the second compressor 144 may be referred to as a low pressure compressor.

In an exemplary embodiment, the compressed air from the compressor wheel 150 of the second turbocharger 140 may also be selectively supplied to the compressed air cavity 174 of the wastegate valve 160 via the third conduit 178. For example, at times when the monitored engine load is less than or equal to a predetermined engine load at the monitored engine speed, the controller 192 controls the control valve 190 such that the valve 190 is in a closed position. As a result, the compressed air is not supplied to the compressed air cavity 174, and the wastegate valve is closed. When the monitored engine load is greater than the predetermined engine load at the monitored engine speed, the controller 192 controls the control valve 190 to open such that compressed air is supplied to the compressed air cavity 174.

As described above, the control valve 190 may be alternatively or additionally opened when the monitored engine speed is greater than the predetermined engine speed at the monitored engine load and/or when the monitored temperature of compressed air leaving the first compressor 124 exceeds the predetermined temperature.

When the control valve 190 is opened, the pressure of the air exiting the compressor wheel 150 may cause the diaphragm 164 to move the valving member 166 against the biasing force of the spring 168 if the air pressure is at least a predetermined pressure. For example, if the air pressure is sufficient to cause the diaphragm 164 to compress the spring 168, then the valving member 166 will move to an open position, thereby allowing the flow of exhaust gas through the exhaust cavity 176 and through the exhaust bypass opening 170 to the first conduit 137. In this manner, when the pressurized air exiting the second compressor 144 meets or exceeds a predetermined value determined by the biasing force of the spring, the wastegate valve 160 will open thereby diverting exhaust gas from the first turbine wheel 128.

The airflow system 100 is capable of providing high boost pressure to the engine 110 and maximizing energy recovery from the exhaust. The system 100 may optimize energy recovery by the series turbochargers 120, 140 by keeping the wastegate 160 closed at times when the engine is not operating at a high speed and/or high load, that is, the predetermined speed and the predetermined load, and/or when the temperature of compressed air leaving the first compressor 124 is not excessively high, that is, the predetermined temperature.

Further, the high boost pressure can produce excessively high air temperatures at the first compressor 124, the air cooler 156, and the intake manifold 114. The higher temperatures may lead to an increase in oxides of Nitrogen ($NO_X$) emissions. Thus, while the series turbochargers 120, 140 may improve fuel efficiency by recycling exhaust fluid, an undesirable increase in $NO_X$ emissions may occur.

However, operating the wastegate valve 160 to allow exhaust flow to bypass at least one of the turbines 122, 142 when the predetermined engine speed, predetermined engine load, and/or predetermined temperature is exceeded may lower the compression performed by the respective compressors 124, 144 at those operating conditions. The reduced compression may lower the temperature of the compressed air leaving the first compressor 124 and entering the air cooler 156 and the intake manifold 114. The lower temperature air supplied to the engine 110 via the intake valve 114 may reduce $NO_X$ emissions. Therefore, although the less-compressed air supplied to the engine 110 may result in a lower boost pressure of the engine 110, the lower boost may be an acceptable trade-off for reduced $NO_X$ emissions. Further, since the pressure and temperature of the compressed air at the first compressor 124, the air cooler 156, and the intake manifold 114 may be lower, the first compressor 124, the air cooler 156, and/or the intake manifold 114 may be constructed of less expensive and more readily available components.

In an embodiment, the engine 110 may be a four-cycle, internal combustion engine operating under a "Miller cycle." A "Miller cycle" engine modifies operation of a conventional "Otto cycle" or diesel cycle engine by modifying closing timing of an air intake valve (not shown) associated with the cylinder 112 to alter the supply of compressed air into the cylinder 112. In one exemplary embodiment, a "Miller cycle" engine may close the air intake valve during the compression stroke of the engine 110 to permit the flow of compressed air into and/or out of the cylinder 112 for a portion of the compression stroke. Optionally, the compressed air may be permitted to flow into and/or out of the cylinder 112 for more than half of the compression stroke. As a result, less compression needs to be performed in the cylinder 122, thereby reducing temperatures in the cylinder 112 and reducing the amount of compression work for the engine cycle.

Because of the potential reverse flow of air from the cylinder 112 during the compression stroke under the "Miller cycle" operation, the series turbochargers 120, 140 may be required to increase boost pressure of air supplied to the engine 110 to maintain sufficient air flow to the engine 110. As the boost increases, the temperature of the compressed air being supplied from the first compressor 124 to the intake manifold 114 may increase to excessively high levels. Thus, the airflow system 100 may optimize fuel efficiency when the operating conditions do not exceed the predetermined engine speed, the predetermined engine load, and/or the predetermined temperature. At times when one or more of these operating conditions is exceeded, the airflow system 100 actuates the wastegate 160 to protect the first compressor 124, the air cooler 156, and the intake manifold 114 from excessive temperatures and pressures.

It will be apparent to those skilled in the art that various modifications and variations can be made in the disclosed airflow system for an internal combustion engine without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. An airflow system for an internal combustion engine, the engine having an intake manifold and an exhaust manifold, the airflow system comprising:

a first turbocharger including a first turbine coupled with a first compressor, the first turbine being configured to receive exhaust flow from the exhaust manifold, the first compressor being configured to supply compressed air to the intake manifold;

a second turbocharger including a second turbine coupled with a second compressor, the second turbocharger being arranged in series with the first turbocharger;

a wastegate valve fluidly coupled with the exhaust manifold, the wastegate valve being movable between a first position and second position, the first position allowing fluid flow exhausted by the engine to bypass at least one of the first turbine and the second turbine, the second position restricting fluid flow exhausted by the engine from bypassing the first turbine and the second turbine; and a controller configured to restrict supply of pressurized air to the wastegate valve such that the wastegate is in the second position at times when at least one of (i) a monitored load of the engine is less than or equal to a predetermined load for a monitored speed of the engine, (ii) a monitored speed of the engine is less than or equal to a predetermined speed for a monitored load of the engine, and (iii) a monitored temperature of compressed air leaving the first compressor is less than or equal to a predetermined temperature.

2. The airflow system of claim 1, wherein the controller is configured to supply compressed air to the wastegate valve such that the wastegate valve is moved to the first position at times when at least one of (i) the monitored load of the engine exceeds the predetermined load for the monitored speed of the engine, (ii) the monitored speed of the engine exceeds the predetermined speed for the monitored load of the engine, and (iii) the monitored temperature of compressed air leaving the first compressor exceeds the predetermined temperature.

3. The airflow system of claim 2, further including a spring associated with the wastegate valve, the spring biasing the wastegate valve to the second position.

4. The airflow system of claim 2, further including at least one sensor configured to sense engine speed and engine load.

5. The airflow system of claim 2, wherein the wastegate valve includes a wastegate conduit, the wastegate conduit bypassing at least one of the first turbine and the second turbine.

6. The airflow system of claim 2, wherein the compressed air is supplied from one of the first compressor and the second compressor.

7. The airflow system of claim 2, further including a control valve electrically coupled to the controller, the control valve being fluidly coupled with the wastegate valve, the controller being configured to selectively operate the control valve to restrict and supply compressed air to the wastegate valve.

8. The airflow system of claim 7, wherein the control valve is a two-position valve.

9. The airflow system of claim 7, wherein the control valve is a variable-position valve operable to vary the supply of compressed air to the wastegate valve.

10. An internal combustion engine, comprising:
   an intake manifold;
   an exhaust manifold;
   an engine block defining at least one cylinder, the cylinder being configured to receive compressed air via the intake manifold, the exhaust manifold being configured to receive exhaust flow from the cylinder;
   a first turbocharger including a first turbine coupled with a first compressor, the first turbine being configured to receive exhaust flow from the exhaust manifold, the first compressor being configured to supply compressed air to the intake manifold;
   a second turbocharger including a second turbine coupled with a second compressor, the second turbocharger being arranged in series with the first turbocharger;
   a wastegate valve fluidly coupled with the exhaust manifold, the wastegate valve being movable between a first position and second position, the first position allowing fluid flow exhausted by the engine to bypass at least one of the first turbine and the second turbine, the second position restricting fluid flow exhausted by the engine from bypassing the first turbine and the second turbine;
   a control valve operable to control supply of pressurized air to the wastegate valve; and
   a controller electrically coupled to the control valve, the controller being configured to operate the control valve to restrict the supply of pressurized air to the wastegate valve such that the wastegate is in the second position at times when at least one of (i) a monitored load of the engine is less than or equal to a predetermined load for a monitored speed of the engine, (ii) a monitored speed of the engine is less than or equal to a predetermined speed for a monitored load of the engine, and (iii) a monitored temperature of compressed air leaving the first compressor is less than or equal to a predetermined temperature.

11. The engine of claim 10, wherein the controller is configured to operate the control valve to supply compressed air to the wastegate valve such that the wastegate valve is moved to the first position at times when at least one of (i) the monitored load of the engine exceeds the predetermined load for the monitored speed of the engine, (ii) the monitored speed of the engine exceeds the predetermined speed for the monitored load of the engine, and (iii) the monitored temperature of compressed air leaving the first compressor exceeds the predetermined temperature.

12. The engine of claim 10, further including a spring associated with the wastegate valve, the spring biasing the wastegate valve to the second position.

13. A method of controlling airflow to an internal combustion engine having an air intake manifold and an exhaust manifold, the method comprising:
   imparting rotational movement to a first turbine and a first compressor of a first turbocharger with exhaust air flowing from the exhaust manifold of the engine;
   imparting rotational movement to a second turbine and a second compressor of a second turbocharger with exhaust air flowing from an exhaust duct of the first turbocharger;
   compressing air drawn from atmosphere with the second compressor;
   compressing air received from the second compressor with the first compressor;
   supplying compressed air from the first compressor to the air intake manifold;
   fluidly coupling a wastegate valve with the exhaust manifold, the wastegate valve being movable between a first position and second position, the first position allowing fluid flow exhausted by the engine to bypass at least one of the first turbine and the second turbine, the second position restricting fluid flow exhausted by the engine from bypassing the first turbine and the second turbine;
   monitoring at least one of engine load, engine speed, and temperature of the compressed air leaving the first compressor; and
   selectively controlling the supply of compressed air to the wastegate valve such that the wastegate is in the second position at times when at least one of (i) the monitored load of the engine is less than or equal to a predetermined load for the monitored speed of the engine, (ii) the monitored speed of the engine is less than or equal to a predetermined speed for the monitored load of the engine, and (iii) the monitored temperature of the compressed air leaving the first compressor is less than or equal to a predetermined temperature.

14. The method of claim 13, further including controlling the supply of compressed air to the wastegate valve such that the wastegate valve is moved to the first position at times when at least one of(i) the monitored load of the engine exceeds the predetermined load for the monitored speed of the engine, (ii) the monitored speed of the engine exceeds the predetermined speed for the monitored load of the engine, and (iii) the monitored temperature of compressed air leaving the first compressor exceeds the predetermined temperature.

15. The method of claim 13, further including bypassing at least one of the first turbine and the second turbine with exhaust flow from the exhaust manifold when the wastegate valve is moved to the first position.

16. The method of claim 13, wherein compressed air is supplied from one of the first compressor and the second compressor.

17. The method of claim 13, further including biasing the wastegate valve to the second position.

18. A method of controlling airflow to an internal combustion engine, the method comprising:
   compressing a stream of air in a first turbocharger;
   compressing a stream of air in a second turbocharger;

sensing an engine parameter indicative of performance;

comparing the sensed engine parameter with a predetermined engine parameter; and controlling a supply of compressed air to a compressed air cavity of a wastegate on at least one of the first turbocharger and the second turbocharger in response to said comparing.

19. The method of claim 18, wherein the engine parameter is at least one of engine speed and engine load.

20. The method of claim 18, wherein said controlling includes actuating a valve between the compressed air cavity and a compressor of at least one of the first turbocharger and second turbocharger.

* * * * *